Feb. 10, 1959 J. O. DUNCAN 2,872,953
LIQUID DISPENSING DEVICE
Filed April 30, 1957 2 Sheets-Sheet 1
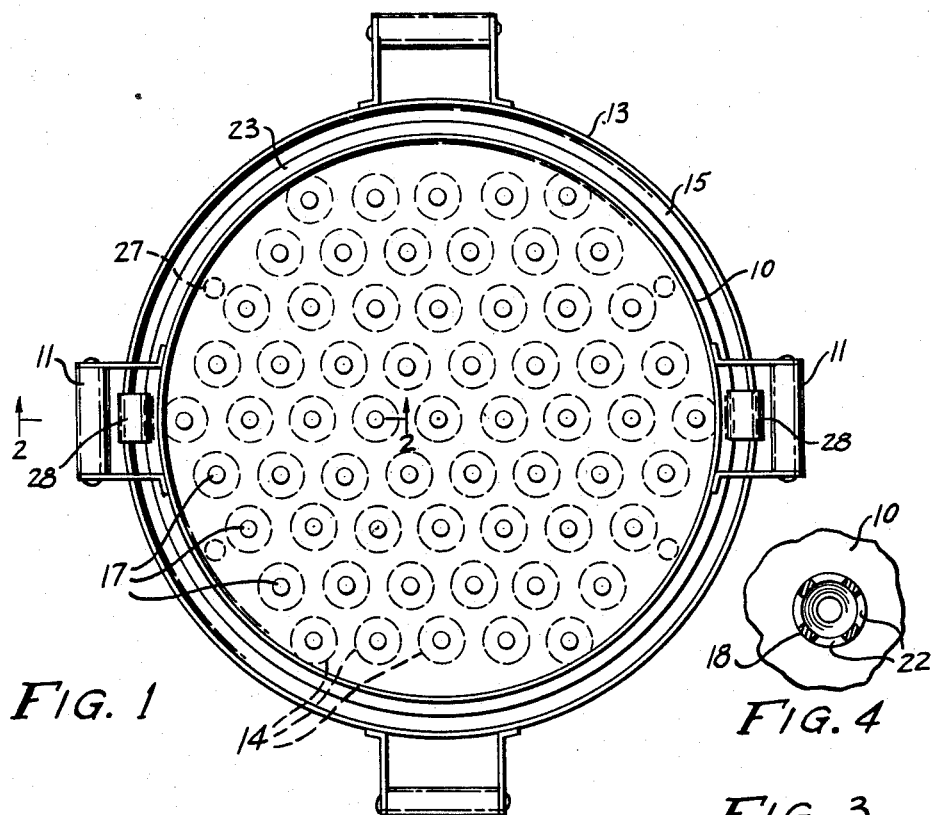
FIG. 1
FIG. 4
FIG. 3
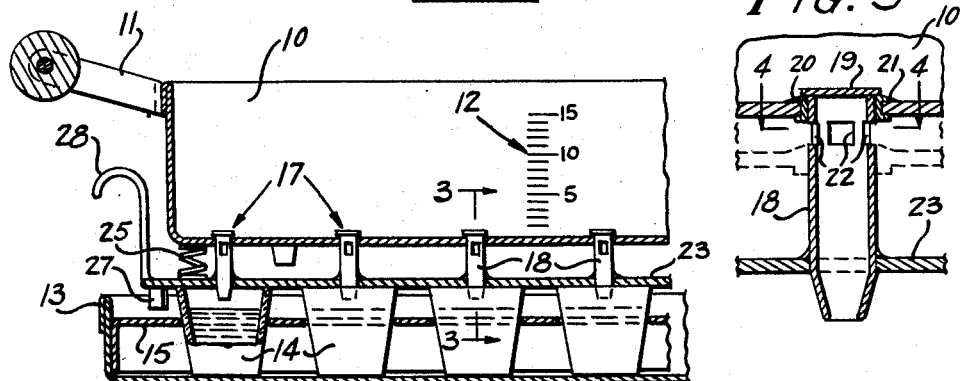
FIG. 2
INVENTOR
JAMES O. DUNCAN
BY Walter S. Paul.
ATTORNEY

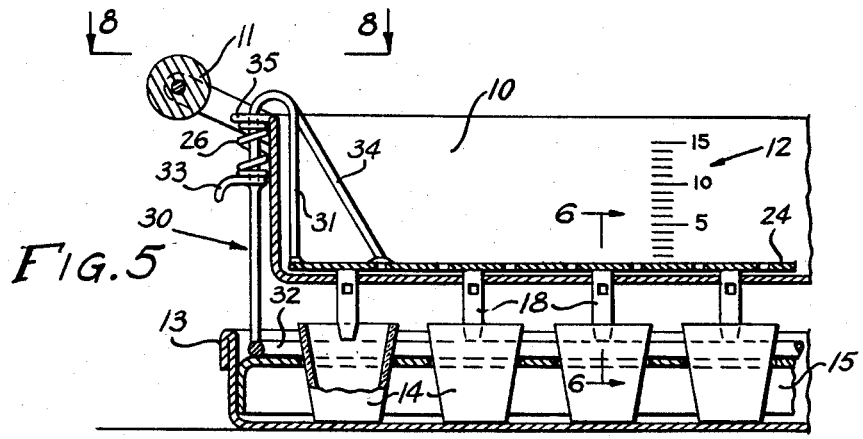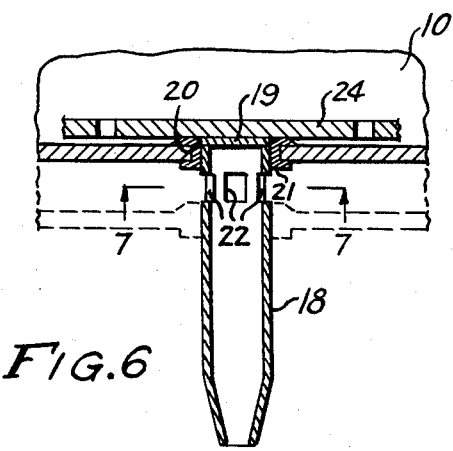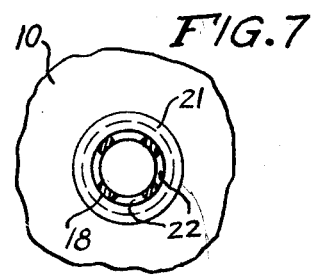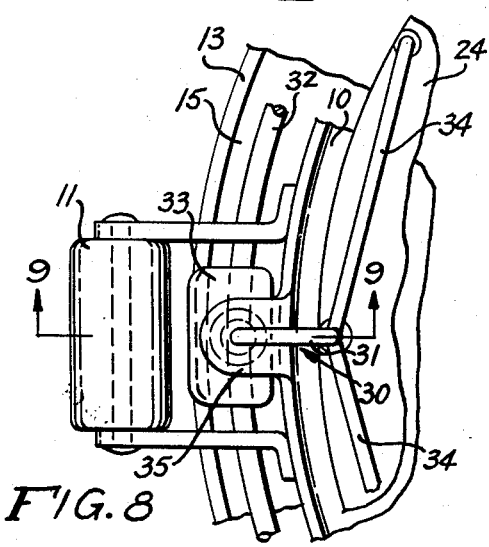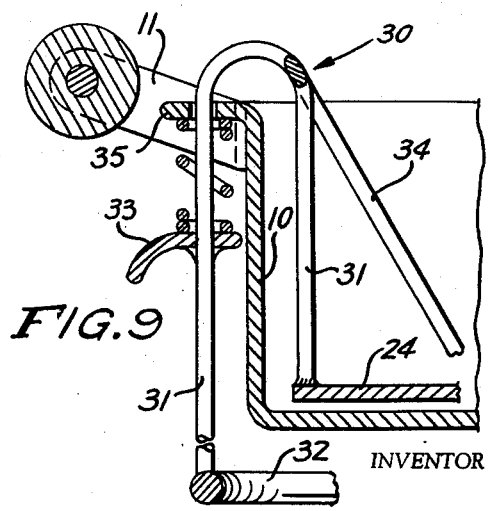

United States Patent Office 2,872,953
Patented Feb. 10, 1959

2,872,953
LIQUID DISPENSING DEVICE
James O. Duncan, Hyattsville, Md.
Application April 30, 1957, Serial No. 655,974
8 Claims. (Cl. 141—237)

This invention relates to wine or the like dispensing means for simultaneously filling all the glasses in each of a series of trays, such as communion trays used in churches to serve wine in individual glasses to a multitude of worshipers in attendance.

The object of this invention is to provide means for enabling a single person to quickly fill a great number of wine glasses or the like, mounted in a series of communion trays, each holding a like number of glasses in a common pattern.

A further object is to construct a bowl or pan of generally the same form and dimensions in plan as the trays above referred to, and having a series of valved nipples extending through its bottom and arranged in the same pattern as the glasses in said trays for delivering the wine from the bowl into the glasses while the bowl is held over the tray, and manually operable means for simultaneously opening all of said nipples to dispense substantially equal amounts of the wine to each glass.

A further object is to provide the above bowl with graduated markings on its side to designate differences in level of the contents for each filling of one tray of glasses, whereby the operator may know when to close the valves without watching the glasses under the bowl during the filling operation.

Another object is to provide a spring bias for normally holding said valves closed.

A further object is to mount the nipples on a common plate for simultaneous operation of the movable parts of the valves which are integral with the respective nipples.

A further object is to provide supports for said bowl etxtending from said plate to a level below the lower ends of said nipples, so as to hold said ends free from the surface upon which the bowl may be placed when not in use.

A further object is to provide the normal valve bias for holding said valves closed of sufficient strength to support the weight of the bowl and contents without opening said valves, where the valves open by upward movement of said plate and nipple assembly.

A further object is to provide the nipple mounting plate below said bowl by attaching it to the lower portions of the nipples.

A further object is to provide this plate inside said bowl by connecting it to the tops of said nipples.

A further object is to provide handles extending from opposite sides of said bowl, and finger operated lifters under each handle connected to the nipple plate for operating said valves.

Other and more specific objects will become apparent as the invention is described in detail, having reference to the accompanying drawings, wherein:

Fig. 1 is a plan view of one form of the invention used in connection with a specific pattern of serving tray, Fig. 2 is an enlarged radial cross-section taken on the line 2—2 of Fig. 1, Fig. 3 is a further enlarged sectional view of a detail taken on the line 3—3 of Fig. 2, Fig. 4 is a detail section taken on the line 4—4 of Fig. 3, Fig. 5 is a radial section similar to that of Fig. 2, but illustrating another form of the device, Fig. 6 is an enlarged detail section taken on line 6—6 of Fig. 5, Fig. 7 is a sectional view taken on the line 7—7 of Fig. 6, Fig. 8 is an enlarged detail plan view taken on the line 8—8 of Fig. 5, and Fig. 9 is a sectional detail view in elevation taken on the line 9—9 of Fig. 8.

The present device is illustrated in two forms, each comprising a bowl 10, having handles 11 extending from its opposite sides, the bowl being provided with graduated markings 12 on its side wall indicating a scale of levels representing increments in the contents for filling one tray full of glasses. The bowl illustrated has a capacity for filling 15 trayfuls of glasses, when filled up to the 15th graduation. Each time a trayful is being filled, the operator holds the valves open long enough to bring the level down one graduation mark.

One of the communion trays 13 with glasses 14 is illustrated in the drawings, having a pattern of arrangement of the glasses in four concentric hexagonal rows, making a total of 61 glasses counting the one in the center, all equally spaced. The tray 13 has an inner guide pan 15 with openings arranged in the hexagonal pattern for holding the glasses 14 in this pattern while they rest on the bottom of the tray. This pan is usually loosely fitted in the tray for easy removal and cleaning. Obviously any other arrangement pattern and size of tray could be selected, to which the present invention might be adapted. The present arrangement and number of glasses as shown in the tray 13 was selected for illustrating how the bowl of the present invention might be adapted to this or any other form of trays having any standard arrangement and number of glasses.

The bowl 10 of the present invention is shown to be round to conform generally to the shape of the trays for which it is adapted, and to provide a multiplicity of valves 17 in its bottom having the same arrangement pattern and spacing as the tray. Each valve comprises a tubular nipple 18 which may or may not be tapered at the bottom, and has a closure 19 at its top with an external flange 20, which seats on the top of the rim of the opening in the bottom of the bowl in which the nipple is slidably mounted. This opening may be lined, as by a grommet 21 of suitable material, to provide a sealing contact with the nipple. The nipple has peripheral ports 22 near its top, having an axial dimension substantially equal to the length of the opening in which the nipple is mounted, whereby to provide a vent for draining the nipple only after the ports are closed off during the closing operation of the valve, thus preventing spilling of any liquid out of the nipple through the vent.

The upper and lower lips of ports 22 could be slightly inclined to a normal plane so as to facilitate their easy passing over the upper and lower edges of the opening.

The nipples are all fixed to a plate 23 at their lower ends as shown in Figs. 1 to 4, or a plate 24 at their top closures as shown in Figs. 5 to 9. These plates are biased by springs 25 and 26 respectively in the two forms, to normally hold the valves 17 closed.

The springs 25 may be positioned directly between the plate 23 and the bottom of the bowl 16, and may be suitably spaced around the periphery of the plate in three or more locations, and are sufficiently strong to support the weight of the bowl and contents, so that the bowl may be set on any flat surface on its supports 27 extending below the plate 23 without causing the valves 17 to open. To open the valves for servicing a trayful of glasses, it is necessary to pull up on the finger brackets 28, extending upwardly from each side of plate 23 to within reach of the operator's fingers, as he holds the bowl over the tray by means of the handles 29 fixed to the sides of the bowl. Another way of opening the valves is merely to press downwardly on the glasses so that the bowl is depressed with relation to the plate 23 to open the valves. This action, of course, may be assisted by pulling up on the finger brackets 28 simultaneously, to relieve the strain on the glasses, if desired.

Plate 24 is preferably perforated to provide unrestricted flow between top and bottom of the plate and is biased by springs 26 through the supporting frame 30 comprising a pair of legs 31 extending from the opposite sides of the plate upwardly over the side of the bowl and down to a base ring 32 upon which the bowl is supported when placed at rest on a flat surface. When dispensing the wine into the glasses in a tray, this ring base fits around the periphery of the glass guide pan surface, where it may be rested and the bowl pressed downwardly and/or the finger brackets 33 pulled upwardly to compress the springs 26 and open the valves 17. Frame 30 is further provided with angular bracket supports 34 between the legs 31 and plate 24 for suitably stiffening the plate support. Similar brackets could be provided between the base ring and the outer portions of the legs, if necessary. The springs 26 are fixed between the finger brackets 33 and ears 35 extending from the bowl 10 and in which the outer leg portions are slidably mounted.

Obviously, the supports 27 or the base ring 32 could be substituted by supports extending directly to the bottom of the bowl and around the outside of the glass area, to relieve the weight of the bowl and contents from resting on the springs and tending to open the valves when the bowl is set aside temporarily between servings. In that event, also, the plate 23 or 24 could be entirely eliminated and substituted by individual light helical springs around each nipple between the bottom of the bowl and retainer means at the bottom of the nipple for resting across the top of each corresponding glass in the tray. This would permit filling of trays having any number of glasses less than the total number of spaces provided for them, because in pressing down on the bowl, only those valves would be opened where the spaces were occupied by a glass.

Many other obvious modifications in form and arrangement of parts may be made without departing from the spirit and scope of the present invention, as defined in the appended claims.

What is claimed is:

1. A wine dispensing device for filling simultaneously all glasses in a holder tray comprising a bowl having a multiplicity of valved nipples slidably mounted through its bottom, a common support plate for simultaneously lifting said nipples to open position, said nipples being arranged in the same pattern in said bottom and spaced like the glass spaces in the tray to be serviced, each nipple having integrally formed therewith the movable part of its valve, spring means for normally biasing said plate downwardly to hold the nipples in valve closed position, and manually operated means on said plate, responsive to pressure of the bowl over the glasses in said tray to move said nipples upwardly with respect to said bowl into valve opened position for simultaneously filling all the glasses in said tray, said bowl having handles extending from opposite sides to facilitate the dispensing operation.

2. A device as defined in claim 1, said manually operated means including base legs extending downwardly from said plate in which all said nipples are mounted to a level below the nipples for normally supporting the bowl on a level surface.

3. A device as defined in claim 2, said plate being fixed to the lower portions of said nipples for pressing over the glasses in the tray during the dispensing operation.

4. A device as defined in claim 3, said spring means comprising three or more coiled springs spaced around the periphery of said plate, between it and the bottom of said bowl.

5. A device as defined in claim 4, said plate having finger brackets extending from each side upwardly to within range of the operator's fingers when holding the bowl by the handles, whereby he may pull up on said finger brackets to operate said valved nipples to open position with reduced or no pressure on said glasses.

6. A device as defined in claim 5, and three or more supports spaced around the periphery of said plate and extending downwardly to form feet for standing said device on a flat surface when not in use.

7. A device as defined in claim 1, said plate being mounted in said bowl, the tops of all said nipples being fixed to said plate for movement therewith, frame members fixed to the sides of said plate adjacent said handles, and extending over the top of the bowl and down to a ring base at a level below the ends of said nipples, and said spring means comprising coiled springs for biasing said frame and plate downwardly with respect to said bowl, said ring base serving to hold the ends of said nipples off the surface upon which the device may be rested when not in use, and also as the manual means to press over the glass holder in said tray for opening the nipples during a filling operation.

8. A device as defined in claim 7, and finger brackets on the portions of said frame members extending within reach of the operator's fingers when holding said bowl by the handles, whereby the operator may pull up on said finger brackets to open all the nipples simultaneously during a filling operation and thus relieve or eliminate entirely the pressure on said glass holder in said tray.

References Cited in the file of this patent

UNITED STATES PATENTS

| 1,858,417 | Reid | May 17, 1932 |

FOREIGN PATENTS

| 346,416 | Germany | Dec. 30, 1931 |
| 602,159 | France | Dec. 18, 1925 |